Patented June 30, 1931

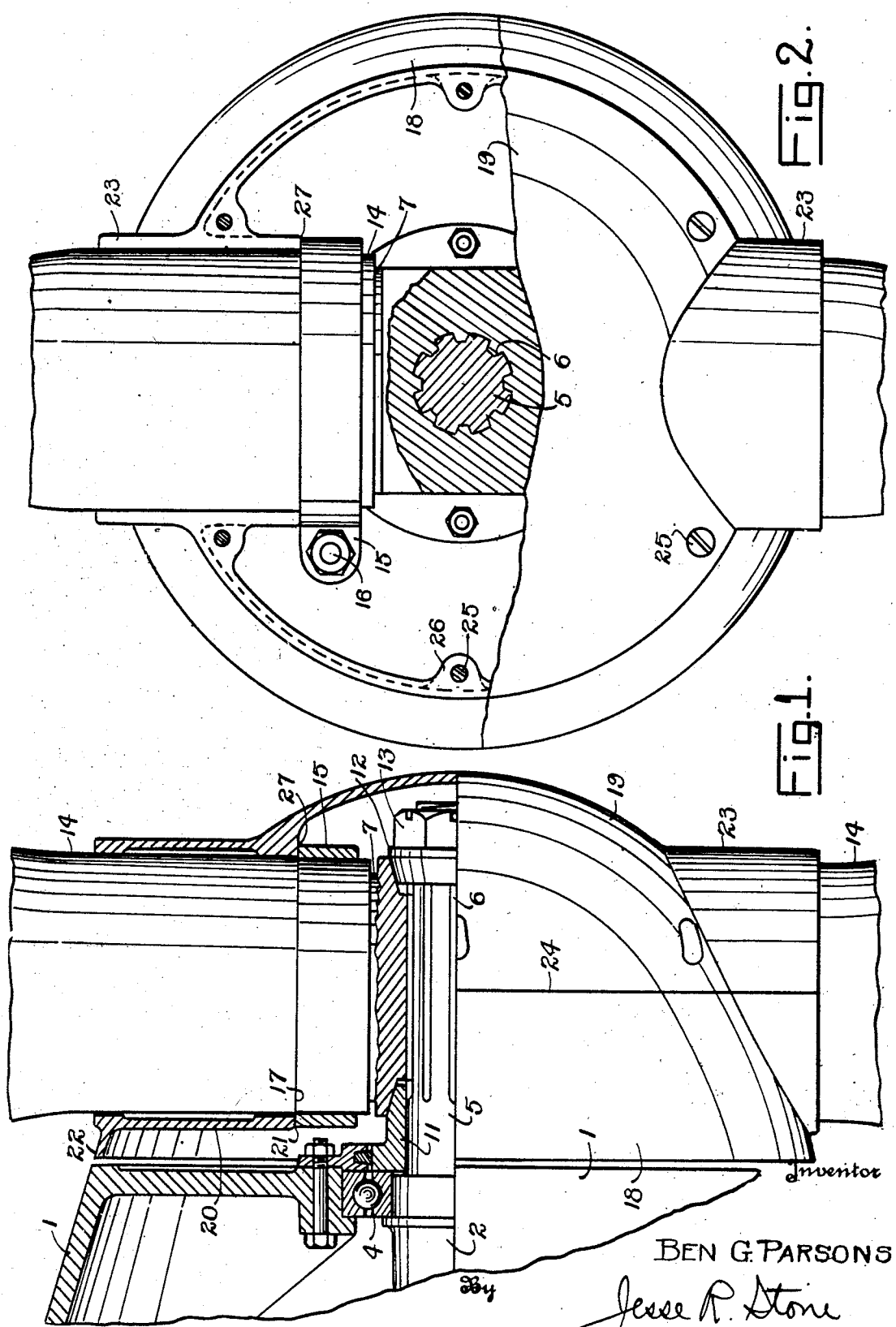

1,812,831

UNITED STATES PATENT OFFICE

BEN G. PARSONS, OF HOUSTON, TEXAS, ASSIGNOR TO HURRICANE MOTOR COMPANY, OF HOUSTON, TEXAS, A CORPORATION OF TEXAS

PROPELLER SPINNER FOR AIRCRAFT ENGINES

Application filed June 6, 1929. Serial No. 368,966.

My invention relates to spinners such as are employed on the forward end of the motor in aircraft and serve as a protection about the forward end of the engine shaft and the propeller blades connected therewith.

In providing a spinner or housing for the engine shaft and hubs of the blades connected therewith, it is an object to so form said housing as to protect the parts and to also shape the same to provide a stream line effect, offering a minimum of resistance to the currents of air through which the plane passes.

An object of the invention is to provide a simple structure for this purpose which is easily assembled upon the plane and capable of accurate positioning upon the support thereof.

I have as a further object of the invention to provide a two part spinner which may be accurately fitted about the propeller blades and secured in position in the most convenient and economical manner.

I desire to provide means whereby the assembly of the device may be readily made with the parts interfitting to be accurately centered about the engine shaft.

In the drawings herewith, Fig. 1 is a side view of the spinner which I have designed, the connected parts being broken away and part of the device being shown in central longitudinal section.

Fig. 2 is a front view of the device, the upper half being broken away centrally of the propeller plates.

My device may be employed upon aircraft engines of various types. I have shown the same as connected to an engine having a crank case 1, in which is rotatably mounted a crank shaft 2, adapted to rotate in bearings 4, set in the forward end of the crank case. The said crank shaft has a forward extension 5 thereon, which serves as a support for the propeller blades. Its forward end is provided with keyways or grooves 6 therein to receive the hub 7 of the propeller.

Said hub is provided with two opposite extensions or hub members 8 which may be hollowed out for lightness. The said hub 7 is adapted to fit upon the shaft 5 and to bear at its inner side against a conical member 11, which serves as a spacer and bearing retainer and is fitted upon the shaft in the forward end of the crank case. A similar conical bearing member 12 at the forward end of the hub is held in place to clamp the hub 7 in position by means of a nut 13.

The hub member 8 is adapted to receive the inner or shank ends of the propeller blades 14. These blades are shown as being made of metal and may have a hollow shank, constructed on its interior to engage with the external portion of the propeller hub. There are several common types of connection between the blade and the hub of the propeller so that this forms no particular part of the invention. A clamping ring 15 is employed to engage about the inner end of the shank of the propeller blade, this ring being split and adapted to fit accurately about the said shank. It may be clamped in position tightly about the propeller blade by means of bolts shown at 16 in Fig. 2, thus clamping the propeller blade firmly upon the hub so that it may not become unscrewed. This ring may fit within a slight recess shown at 17 in the outer face of the propeller blade and serves as an abutment against which the spinner housing may register.

The spinner housing is made up of an inner or motor side section 18 and an outer section 19 at the forward end of the propeller shaft. The housing is thus split transversely into two parts on a plane perpendicular to said shaft. The inner or motor side section is frusto conical in shape and is adapted to fit together with the outer or nose section to form a housing, which is approximately hemispherical. As will be noted from the drawings, however, the curvature is somewhat elliptical so as to give a stream line effect to the total housing, which conforms to the contour of the crank case 1, directly behind it, and to accomplish the diverting of the air currents outwardly, away from the motor, to decrease the air resistance.

The inner or motor side section is formed with two semi-cylindrical sleeve portions 20 thereon, which are adapted to fit about the inner sides of the shanks of the propeller blades, the inner end of each sleeve 20 having a shoulder 21 thereon to fit against the outer end of the clamping ring 15. The portion of the housing rearwardly of the sleeve 20 forms a rim 22 which is spaced slightly from the forward side of the crank case sufficiently to provide clearance for rotation.

The outside section of the spinner housing is also provided with semi-cylindrical sleeves 23, which together with the sleeves 20 of the motor section entirely close about the shanks of the propeller blades and the two sections fit together along their meeting edges at 24 so as to form, in effect, a single unitary housing for the shaft. The forward side is secured to the rearward side by means of screws 25, which are screwed within threaded openings formed in lugs 26 upon the meeting faces of the two sections of the spinner. These screws may be readily inserted and may be removed when the interior of the spinner housing is to be inspected.

It is to be noted that the outer section 19 of the spinner also is provided with an inner shoulder at 27, which engages against the exterior of the clamping ring 15 so as to assist in bringing the parts into accurate registration and balanced uniformly about the crank shaft as a center. I am thus enabled to firmly and accurately center the spinner on the shaft so that there will be no wobbling or vibration due to improper mounting of the spinner upon the shaft.

When the parts are to be assembled the inner or motor side of the spinner will be placed about the shanks of the propeller blades in accurate position, the hub is then placed upon the shaft 5 so that its inner side engages the member 11 and the ring 12 is next put in place. After thus being securely mounted, the nut 13 is tightened in position and the outer section of the spinner may be assembled by fitting it about the shanks of the propeller blades with the shoulder 27 against the outer ends of the rings 15 and the parts will be accurately positioned so that the screws 25 may be inserted to lock the parts together. This structure is simple and easily and cheaply constructed but forms a housing which is very readily attached or detached to allow inspection of the interior thereof and which forms with the crank case a stream line housing which is particularly desirable in airplanes. This housing is entirely complete without the necessity of other parts being added or removed after the parts have been assembled as is necessary in structures now in common use. Features of value connected therewith include the means by which the parts may be accurately registered and held firmly in position and properly centered about the shaft. It is to be understood that the spinner may be made of any suitable metal or other material as desired.

What I claim as new is:

1. In combination with a forwardly curved crank case, a crank shaft therein projecting from said crank case, a propeller hub on said shaft, blades on said hub, and clamping rings on said blades; a spinner housing the forward end of said shaft, said spinner including outer and inner sections adapted to be secured together to enclose the said hub, and shoulders on said sections engaging and registering against said clamping rings.

2. In combination with a forwardly curved crank case, a crank shaft therein projecting from said crank case, a propeller hub on said shaft, blades on said hub, and clamping rings on said blades; a spinner housing the forward end of said shaft, said spinner including outer and inner sections adapted to be secured together to enclose the said hub and shaped to form a stream line with said crank case, and shoulders on said sections engaging and registering against said clamping rings.

3. In combination with a forwardly curved crank case, a crank shaft therein projecting from said crank case, a propeller hub on said shaft, blades on said hub, and clamping rings on said blades; a spinner housing the forward end of said shaft, said spinner including a circular inner section fitting about the inner side of said hub, means thereon to engage said blades, and abut against said clamping rings, and an outer section closing the outer end of said inner section, and means to secure said sections together.

4. In combination with a forwardly curved crank case, a crank shaft therein projecting from said crank case, a propeller hub on said shaft, blades on said hub, and clamping rings on said blades; a spinner housing the forward end of said shaft, said spinner comprising a casing shaped to form a streamline with said crank case and including two parts fitting together transversely of said shaft, means to secure said parts together, and means on said spinner engaging said blades to register said spinner in position centered relative to said shaft.

5. A spinner for aircraft propeller shafts including a housing rounded on its outer end in advance of said shaft and divided transversely to fit about the propeller blades.

6. A spinner for aircraft propeller shafts including a housing rounded on its outer end in advance of said shaft and divided transversely to fit about the propeller blades, means on said housing engaging means on said propeller blades to register said spinner on said shaft in accurately centered position.

7. A spinner for aircraft propeller shafts including a housing rounded on its outer end in advance of said shaft and divided transversely to fit about the propeller blades, oppositely extending sleeve members on said housing to engage about the propeller blades, clamping rings on said blades, and shoulders on said spinner to engage and register against said rings.

8. A spinner for aircraft propeller shafts having propeller hubs thereon and blades on said hubs, comprising outer and inner sections meeting along a plane perpendicular to said shaft, and acting to house said shaft and hubs, said outer section being separately removable to expose said shaft and said hubs, and means to secure said sections detachably together.

9. A spinner for aircraft propeller shafts having propeller hubs thereon and blades on said hubs, comprising outer and inner sections meeting along a plane perpendicular to said shaft, and acting to house said shaft and hubs, said outer section being separately removable to expose said shaft and said hubs, means on each of said sections to engage about said blades to center said sections, and means to secure said sections detachably together.

10. An aircraft propeller spinner comprising a frusto-conical inner section and a semi-ovoid nose section, said sections being arranged for engagement about the propeller hubs along the line of their meeting edges.

In testimony whereof I hereunto affix my signature this 30th day of May, A. D. 1929.

BEN G. PARSONS.